US012284744B2

(12) United States Patent
Kim et al.

(10) Patent No.: US 12,284,744 B2
(45) Date of Patent: Apr. 22, 2025

(54) ELECTROMAGNETIC WAVE GENERATION DEVICE AND CONTROL METHOD THEREFOR

(71) Applicants: AweXome Ray, Inc., Anyang-si (KR); Sang Soo Kim, Seoul (KR)

(72) Inventors: Sang Soo Kim, Seoul (KR); Se Hoon Gihm, Seongnam-si (KR); Hong Soo Choi, Seoul (KR); Keun Soo Jeong, Seoul (KR)

(73) Assignees: AweXome Ray, Inc., Anyang-si (KR); Sang Soo Kim, Seoul (KR)

( * ) Notice: Subject to any disclaimer, the term of this patent is extended or adjusted under 35 U.S.C. 154(b) by 202 days.

(21) Appl. No.: 18/245,824

(22) PCT Filed: Sep. 18, 2020

(86) PCT No.: PCT/KR2020/012662
§ 371 (c)(1),
(2) Date: Mar. 17, 2023

(87) PCT Pub. No.: WO2022/059821
PCT Pub. Date: Mar. 24, 2022

(65) Prior Publication Data
US 2023/0345609 A1 Oct. 26, 2023

(51) Int. Cl.
*H05G 1/26* (2006.01)
*H05G 1/08* (2006.01)
*H05G 1/34* (2006.01)

(52) U.S. Cl.
CPC ............. *H05G 1/265* (2013.01); *H05G 1/085* (2013.01); *H05G 1/34* (2013.01)

(58) Field of Classification Search
CPC .......... H05G 1/32; H05G 1/265; H05G 1/085; H05G 1/34
See application file for complete search history.

(56) References Cited

U.S. PATENT DOCUMENTS 9,552,955 B2 * 1/2017 Beckmann ............... H05G 1/70
11,558,950 B2 1/2023 Fritz et al.
2003/0147498 A1 8/2003 Hadland et al.
(Continued)

FOREIGN PATENT DOCUMENTS

CN 1443435 A 9/2003
CN 102119000 A 7/2011
CN 102468102 A 5/2012
(Continued)

OTHER PUBLICATIONS

WO 2019/151251 A1 and it's English translation (Year: 2019).*

*Primary Examiner* — Chih-Cheng Kao
(74) *Attorney, Agent, or Firm* — Seed IP Law Group LLP

(57) ABSTRACT

Provided is an electromagnetic wave generation device including a tube including an anode, a cathode and at least one gate, a first power supply circuit in which one side of an output terminal is connected to the anode, a second power supply circuit in which one side of an output terminal is connected to the gate, and a current-sensing circuit connected to the tube and sensing a current flowing through the cathode, in which the current-sensing circuit includes at least one resistance associated with the sensing of at least one of an anode current and a gate current.

16 Claims, 11 Drawing Sheets

(56) References Cited

U.S. PATENT DOCUMENTS

| | | | |
|---|---|---|---|
| 2011/0122996 | A1 | 5/2011 | Levene et al. |
| 2020/0144015 | A1 | 5/2020 | Düsberg et al. |

FOREIGN PATENT DOCUMENTS

| | | | |
|---|---|---|---|
| CN | 109068468 | A | 12/2018 |
| DE | 102010043540 | A1 | 3/2012 |
| JP | 2002164197 | A | 6/2002 |
| JP | 4860202 | B2 | 1/2012 |
| JP | 2019113465 | A | 7/2019 |
| KR | 20120060613 | A | 6/2012 |
| KR | 101348840 | B1 | 1/2014 |
| KR | 101648063 | B1 | 8/2016 |
| WO | WO 2019042587 | A2 | 3/2019 |
| WO | WO 2019151251 | A1 | 8/2019 |

* cited by examiner

ELECTROMAGNETIC WAVE GENERATION DEVICE AND CONTROL METHOD THEREFOR

BACKGROUND

Technical Field

This disclosure relates to an electromagnetic wave generation device and a control method thereof. More specifically, this disclosure relates to any electromagnetic wave generation device that generates EUV, X-rays, and the like, and in particular, to an electromagnetic wave generation device that requires accurate measurement of anode current and a control method thereof.

Description of the Related Art

Electromagnetic wave is a type of energy widely used in radio and television to mobile phones, weather observations, and military radars. For example, ultraviolet rays are used for sterilization, infrared rays are used for heating, remote controls, etc., and there are many other applications of electromagnetic waves, such as microwaves for microwave ovens and radio waves for TV, radio, and mobile phones. Among them, X-rays and gamma rays are wavelengths used for X-ray photography or radiotherapy. A radiography device, one of electromagnetic wave generation devices, uses X-rays, gamma rays, or similar ionizing and non-ionizing radiation to inspect the internal shape of an object. Such radiography devices include medical radiography devices and industrial radiography devices. For example, the medical radiography devices include dental portable X-ray devices, computed tomography (CT) devices, and the like.

The quality of the image produced by any radiography device that utilizes X-rays is related to the voltage between the anode and cathode within the X-ray tube (or the current flowing between the anode and cathode). These voltages or currents vary depending on how the tube is driven by the device used. For example, in mammography, good tissue contrast can be achieved with relatively low currents, while typical X-ray systems use high voltages. Because of the high voltage, most X-ray systems are prone to errors and image artifacts caused by inaccurate tube voltage.

The stability of the voltage/current (or absolute kVp/mA value) of an X-ray system can also be degraded by component stress or long-term component drift generated by "spits" in the X-ray tube. This requires periodic kVp/mA recalibration by service personnel, which can be a time consuming task. There are commercially available instruments that enable measurement of kVp/mA from differential filtering of the X-ray beam, but these instruments are expensive, cumbersome to use, and not highly precise. Moreover, the available instruments cannot measure kVp/mA without service personnel to insert the measurement device into the beam, and beam measurements are not performed while the system is being used on a patient.

The foregoing information disclosed in the background art of this disclosure is only for better understanding of the background of this disclosure, and may therefore include information that does not constitute prior art.

BRIEF SUMMARY

One or more embodiments provide accurately measuring the current flowing between the anode and the cathode in the tube of the electromagnetic wave generation device, and adjusting the power value of the gate according to the measured current value to automatically compensate for the current flowing between the anode and the cathode.

Another aspect provides an electromagnetic wave generation device including a radiography device capable of steadily obtaining an optimal image by verifying the operation of the device based on the predicted value and the measured value of the current flowing between the anode and the cathode.

Yet another aspect provides a method of measuring the current value related to at least one node among the anode, cathode, and gate to control the required current value for electromagnetic wave generation based thereon and a device using the same.

Still another aspect provides a control method capable of generating a desired level of electromagnetic waves by accurately sensing the current value flowing through the anode and controlling the current value, and an electromagnetic wave generation device using the same.

The technical aspects of the present disclosure are not limited to those mentioned above, and other technical aspects can be inferred from the following example embodiments.

According to some embodiments, there is provided an electromagnetic wave generation device including a tube including an anode, a cathode and at least one gate, a first power supply circuit in which one side of an output terminal is connected to the anode, a second power supply circuit in which one side of an output terminal is connected to the gate, and a current-sensing circuit connected to the tube and sensing a current flowing through the cathode. The current-sensing circuit may include at least one resistance associated with the sensing of at least one of an anode current and a gate current.

In the electromagnetic wave generation device according to an example embodiment, the at least one resistance may include a first resistance having one side connected to the cathode and the other side connected to a ground terminal, and the other side of the output terminal of the second power supply circuit may be connected to the ground terminal.

In addition, in the electromagnetic wave generation device according to an example embodiment, the at least one resistance may include a second resistance having one side connected to the cathode and the ground terminal and the other side connected to an input terminal of a first amplifier, and the other side of the second resistance may be connected to the other side of the output terminal of the first power supply circuit. An operation of the second power supply circuit may be controlled based on an output of the first amplifier.

In addition, in the electromagnetic wave generation device according to an example embodiment, the operation of the second power supply circuit may be controlled based on current information related to the first resistance and an output voltage of the second power supply circuit.

In the electromagnetic wave generation device according to an example embodiment, the first power supply circuit may include a third resistance having one side connected to the other side of the output terminal of the first power supply circuit and the other side connected to the ground terminal.

In addition, in the electromagnetic wave generation device according to an example embodiment, the at least one resistance may include a fourth resistance having one side connected to the cathode and the other side connected to the ground terminal, and a fifth resistance having one side connected to the fourth resistance and the ground terminal and the other side is connected to one side of an input terminal of a first adder. At this time, the one side of the fourth resistance may be connected to the other side of the input terminal of the first adder, and the other side of the fifth resistance may be connected to the other side of the output terminal of the second power supply circuit. Also, the operation of the second power supply circuit may be controlled based on an output of the first adder.

In addition, in the electromagnetic wave generation device according to an example embodiment, the operation of the second power supply circuit may be controlled based on current information related to the third resistance and current information related to the fourth resistance.

The gate may be any one of gates of grid, wire, or pin-hole structure. Also, the cathode may be comprised of carbon nanotubes (CNTs).

According to another aspect, there is also provided a control method of an electromagnetic wave generation device including identifying an anode current value required for electromagnetic wave generation, determining a voltage supplied to an anode and a voltage supplied to a gate based on the identified anode current value, and controlling the voltage supplied to the gate based on current-sensing information about at least one of the anode current, a gate current, and a current flowing through the cathode.

According to example embodiments, it is possible to provide an electromagnetic wave generation device capable of automatically compensating for the current flowing between the anode and the cathode in the tube of the electromagnetic wave generation device by accurately measuring the current flowing between the anode and the cathode in the tube and adjusting the voltage value of the gate according to the measured current value. In addition, according to example embodiments, provided is an electromagnetic wave generation device including a radiography device capable of steadily obtaining an optimal image by verifying the operation of the device based on the predicted value and the measured value of the current flowing between the anode and the cathode.

For example, an example embodiment of the present disclosure may include a current-sensing circuit connected to the tube and sensing the current flowing through the cathode. The current-sensing circuit may include at least one resistance associated with the sensing of at least one of the anode current and the gate current. Here, the at least one resistance may include a first resistance having one side connected to the cathode and the other side connected to the ground terminal, and a second resistance having one side connected to the cathode and the ground terminal and the other side connected to the input terminal of the amplifier. Based on the first resistance and the second resistance, the current supplied to the anode and the current supplied to the gate can be accurately sensed, and the gate voltage and the anode current of the tube can be automatically adjusted and compensated for.

As another example, an example embodiment of the present disclosure may include a third resistance having one side connected to the other side of the output terminal of the anode power supply circuit and the other side connected to the ground terminal, a fourth resistance having one side connected to the cathode and the other side connected to the ground terminal, and a fifth resistance having one side connected to the fourth resistance and the ground terminal and the other side connected to one side of the input terminal of the adder. Based on the third to fifth resistances, the current supplied to the anode and the current supplied to the gate may be accurately sensed, and the gate voltage and the anode current of the tube may be automatically adjusted and compensated for.

In particular, example embodiments of the present disclosure are useful and applicable to a cathode-type X-ray tube made of CNT capable of micro-current control. In addition, it is applicable to portable electromagnetic wave generation devices in addition to installation type electromagnetic wave generation devices.

The technical benefits of the present disclosure are not limited to the benefits mentioned above, and other benefits not mentioned will be clearly understood by those skilled in the art from the description of the claims.

DETAILED DESCRIPTION

Figure 1A:
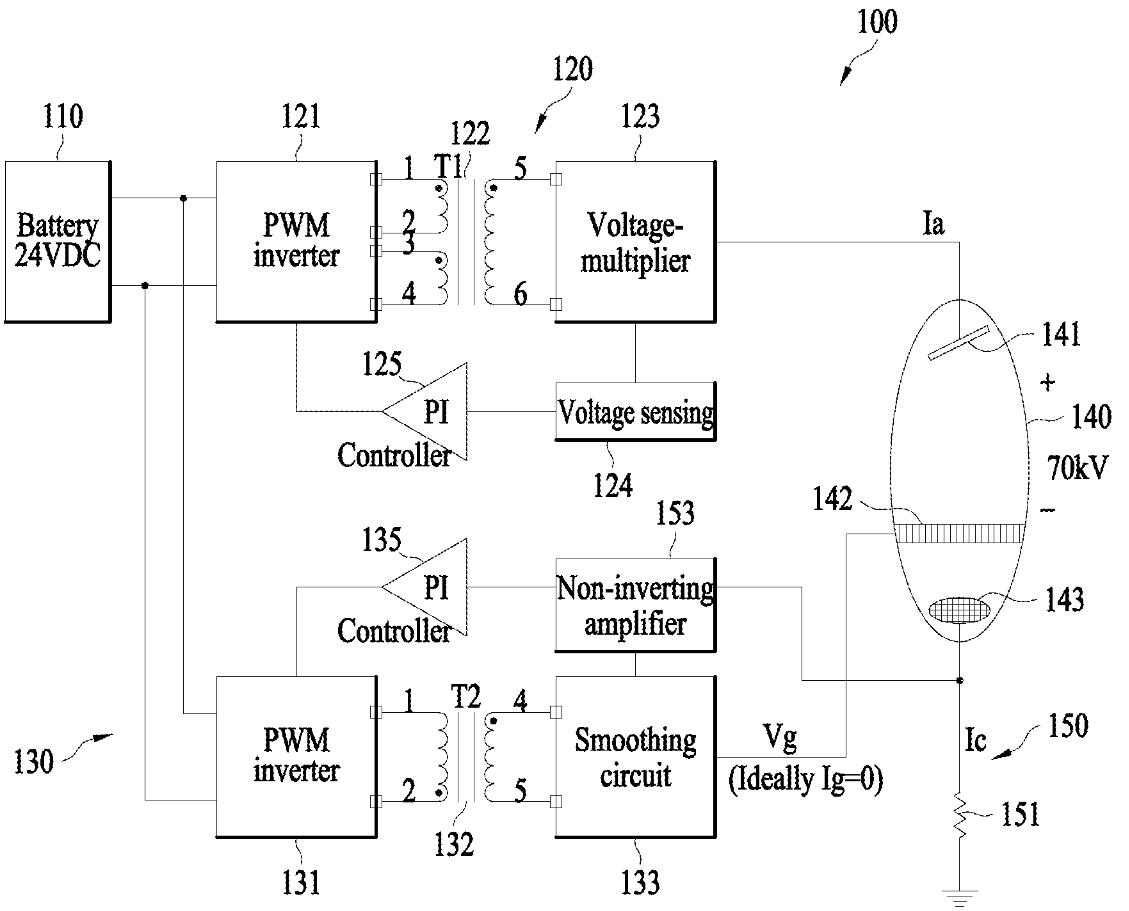
FIGS. 1A, 1B and 2 are block diagrams for explaining a configuration of an electromagnetic wave generation device and a current-sensing method.

The terms used in example embodiments have been selected as general terms that are currently widely used as possible while taking functions in the present disclosure into consideration, but these may vary according to the intention of those skilled in the art, a precedent, the emergence of new technologies, and the like. In addition, in certain cases, there are terms arbitrarily selected by the applicant, and in this case, the meaning will be described in detail in the corresponding description. Therefore, the terms used in the present disclosure should be defined based on the meaning of the term and the whole contents of the present disclosure, not just the name of the term.

In addition, in the following drawings, the thickness or size of each layer is exaggerated for convenience and clarity of explanation, and the same reference numerals refer to the same elements in the drawings. As used herein, the term “and/or” includes any one and all combinations of one or more of the listed items. For example, the expression “at least one of a, b, and c” throughout the specification may include ‘a only,’ ‘b only,’ ‘c only,’ ‘a and b,’ ‘a and c,’ ‘b and c,’ or ‘all of a, b, and c.’ In addition, the term “connected” in the present specification means not only when member A and member B are directly connected, but also when member A and member B are indirectly connected by interposing member C between member A and member B.

As used herein, the singular form includes the plural form as well unless otherwise specified in the phrase. Throughout the specification, when it is stated that a part "comprises" or "includes" a certain component, it means that other components may further be included, and it does not preclude other components, unless otherwise stated. As used herein, terms such as " . . . part," " . . . module," and the like described in the present specification mean a unit for performing at least one function or operation, which may be implemented as hardware or software, or as a combination of hardware and software.

Throughout the specification, terms such as "first," "second," and so on are used to describe various members, components, areas, layers and/or parts, but it is obvious that these members, components, areas, layers and/or parts should not be limited by these terms. These terms are used only for the purpose of distinguishing one member, component, area, layer and/or part component from another member, component, area, layer and/or part. Accordingly, a first member, component, area, layer and/or part may be referred to as a second member, component, area, layer and/or part without departing from the scope of the present disclosure.

In the following, with reference to the accompanying drawings, example embodiments of the present disclosure will be described in detail so that those of skilled in the art to which the present disclosure pertains may easily implement them. However, the present disclosure may be implemented in various different forms and is not limited to the example embodiments described herein. Hereinafter, example embodiments of the present disclosure will be described in detail with reference to the drawings.

Figure 1B:
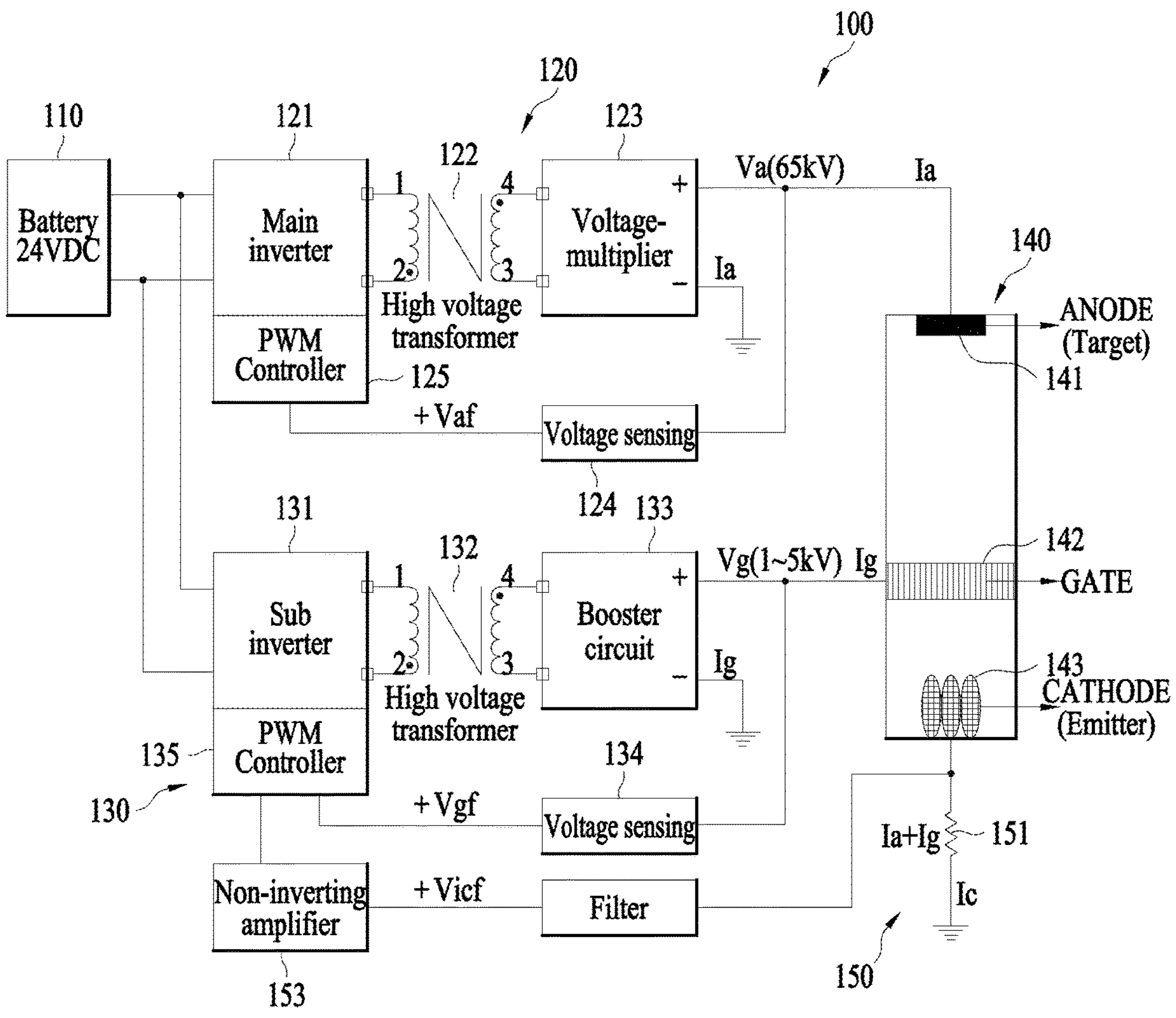
Figure 2:
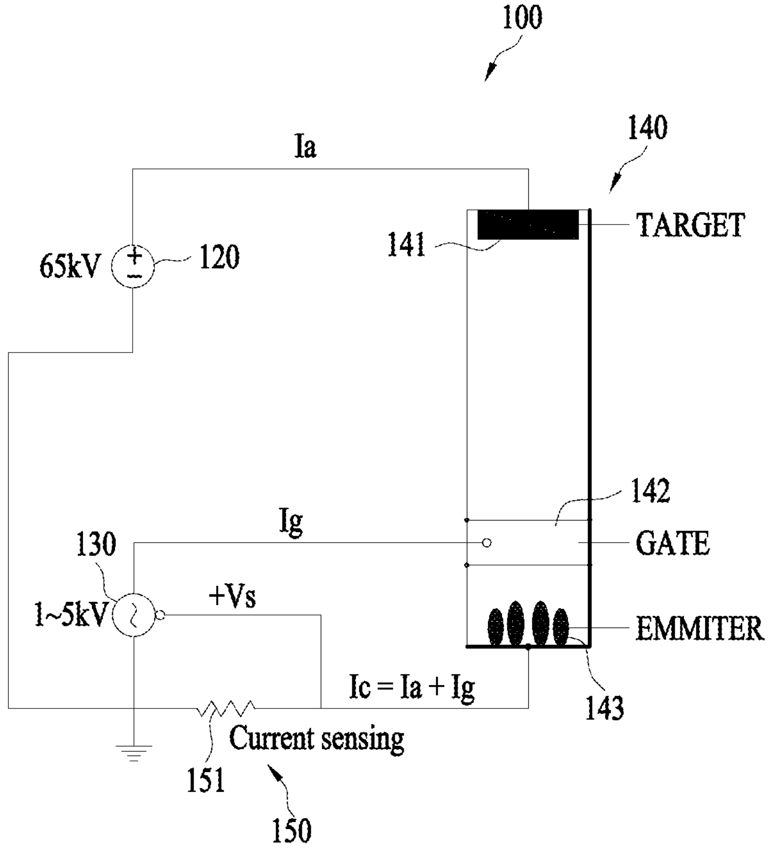

FIGS. 1A, 1B and 2 are block diagrams for explaining a configuration of an electromagnetic wave generation device 100 and a current-sensing method.

As shown in FIG. 1A, the electromagnetic wave generation device 100 may include a power supply 110, an anode power supply circuit 120, a gate power supply circuit 130, a tube 140 and a current-sensing circuit 150.

The power supply 110 may supply DC power to the anode power supply circuit 120 and the gate power supply circuit 130. In some examples, the power supply 110 may include batteries such as lithium ion batteries, lithium polymer batteries, and lithium solid batteries.

The anode power supply circuit 120 may be electrically connected to the power supply 110 to supply high voltage anode DC power to an anode 141 provided in the tube 140. In some examples, the anode power supply circuit 120 may supply DC power of approximately 50 to 70 kV to the anode 141 of the tube 140. In some examples, the anode power supply circuit 120 may include a PWM (pulse width modulation) inverter 121, an isolation transformer 122, and a booster circuit 123 (a voltage-multiplier or a smoothing circuit). In addition, the anode power supply circuit 120 may further include a voltage sensing unit 124 and a proportional integral controller (PWM controller) 125. Meanwhile, in this example embodiment, the tube is described based on the X-ray tube, but is not limited thereto, and example embodiments of the present specification may be similarly applied to any tube that can be used in the electromagnetic wave generation device.

In this way, the PWM inverter 121 connected to the power supply 110 converts the DC power to the AC power to output. In addition, such AC power is boosted by the isolation transformer 122, and the high voltage DC power may be applied to the anode 141 of the tube 140 by the booster circuit 123. At this time, the output voltage of the booster circuit 123 is sensed by the voltage sensing unit 124, and based on the sensed value, the proportional integral controller 125 may provide a PWM signal (PWM signal with its duty ratio is adjusted) to the PWM inverter 121. As a result, DC power with a certain level may be supplied constantly to the anode 141 of the tube 140 by the booster circuit 123. Here, the tube 140 may be an X-ray tube, and the current supplied to the anode 141 of the tube 140 may be defined as Ia. Meanwhile, the operation of the PWM inverter may be controlled based on the PWM signal with the duty ratio adjusted in the example embodiment, and accordingly, the power supplied to at least one of the nodes of the tube 140 may be controlled.

The gate power supply circuit 130 is electrically connected to the power supply 110 to supply the gate DC power to a gate 142 provided in the tube 140. In some examples, the gate power supply circuit 130 may supply DC power of approximately 1 to 5 kV to the gate 142 of the tube 140. Here, a cathode 143 of the tube 140 may be connected to the current-sensing resistance 151. In some examples, the gate power supply circuit 130 may include a PWM inverter 131, an isolation transformer 132, and a booster circuit 133 (a voltage-multiplier or a smoothing circuit).

In this way, the PWM inverter 131 connected to the power supply 110 converts the DC power to the AC power to output. In addition, such AC power is boosted by the isolation transformer 132, and the high voltage DC power may be applied to the gate 142 of the tube 140 by the booster circuit 133. Here, the tube 140 may be an X-ray tube, the voltage applied to the gate 142 of the tube 140 may be defined as Vg, and the current may be defined as Ig.

The tube 140 may include the anode 141, the gate 142 and the cathode 143. The anode 141 may be connected to the anode power supply circuit 120, and the gate 142 and the cathode 143 may be connected to the gate power supply circuit 130 and the current-sensing resistance 151, respectively. The gate 142 may be any of the gates of grid, wire or pin-hole structure. In addition, the gate 142 may be made of one or more wires and one or more empty spaces. In the tube 140, the gate 142 may be one, or it may be a multi-gate made of several gates.

The current-sensing circuit 150 may be connected to the cathode 143 of the tube 140, and it may sense the value of the current flowing between the anode 141 and the cathode 143 of the tube 40 to provide to the gate power supply circuit 130.

Here, the current-sensing circuit 150 may include a current-sensing resistance 151 connected between the cathode 143 of the tube 140 and the ground terminal and a non-inverting amplifier 153 connected to the current-sensing resistance 151. The non-inverting amplifier 153 may be connected to the proportional integral controller 135 of the gate power supply circuit 130. In addition, the current flowing through the current-sensing resistance 151 may be defined as Ic.

In this way, the current Ic is sensed by the current-sensing circuit 150, and the sensed value may be amplified by the non-inverting amplifier 153. Based on the amplified value, the proportional integral controller 135 may provide the PWM signal (PWM signal with its duty ratio adjusted) to the PWM inverter 131. As a result, a DC power of a predetermined level (changed level) may be supplied to the gate 142 of the tube 140 by the booster circuit. That is, the current flowing through the interior of the tube 140 may be proportionally controlled by the voltage Vg by the gate power supply circuit 130. Here, the larger the current Ia flowing inside the tube 140, the greater the amount of electromagnetic wave.

On the other hand, as shown in FIG. 1B, the PWM inverter 121 of the anode power supply circuit 120 may be indicated as the main inverter 121 and the PWM controller 125, and the PWM inverter 131 of the gate power supply circuit 130 may be indicated as the sub inverter 131 and the PWM controller 135.

Here, the voltage applied to the gate 142 by the booster circuit 133 of the gate power supply circuit 130 may be sensed with the voltage sensing unit 134 and provided to the PWM controller 135, and the current flowing in the current-sensing resistance 151 of the current-sensing circuit 150 may be converted into a voltage value and may be provided to the PWM controller 135 via the filter and through the non-inverting amplifier 153.

In addition, as shown in FIG. 2, the current flowing the current-sensing resistance 151 of the current-sensing circuit 150 may be an Ic, which is a current value satisfying Ic=Ia+Ig. Ig is a leakage current, which may have a negative value in the above equation, and the closer Ig to 0, the closer Ic to Ia, ideally.

However, in this current-sensing method, the current Ia actually supplied to the anode 141 cannot be directly measured due to the high voltage, and the current value measured through the current-sensing resistance 151 may be a current value measured with Ig added. Therefore, the initial Ig is somewhat generated in the structure of the tube 140, and the Ig gradually increases with a long time use, which causes an inaccurate control to make Ia gradually decrease and reduce the amount of electromagnetic wave.

Figure 3A:
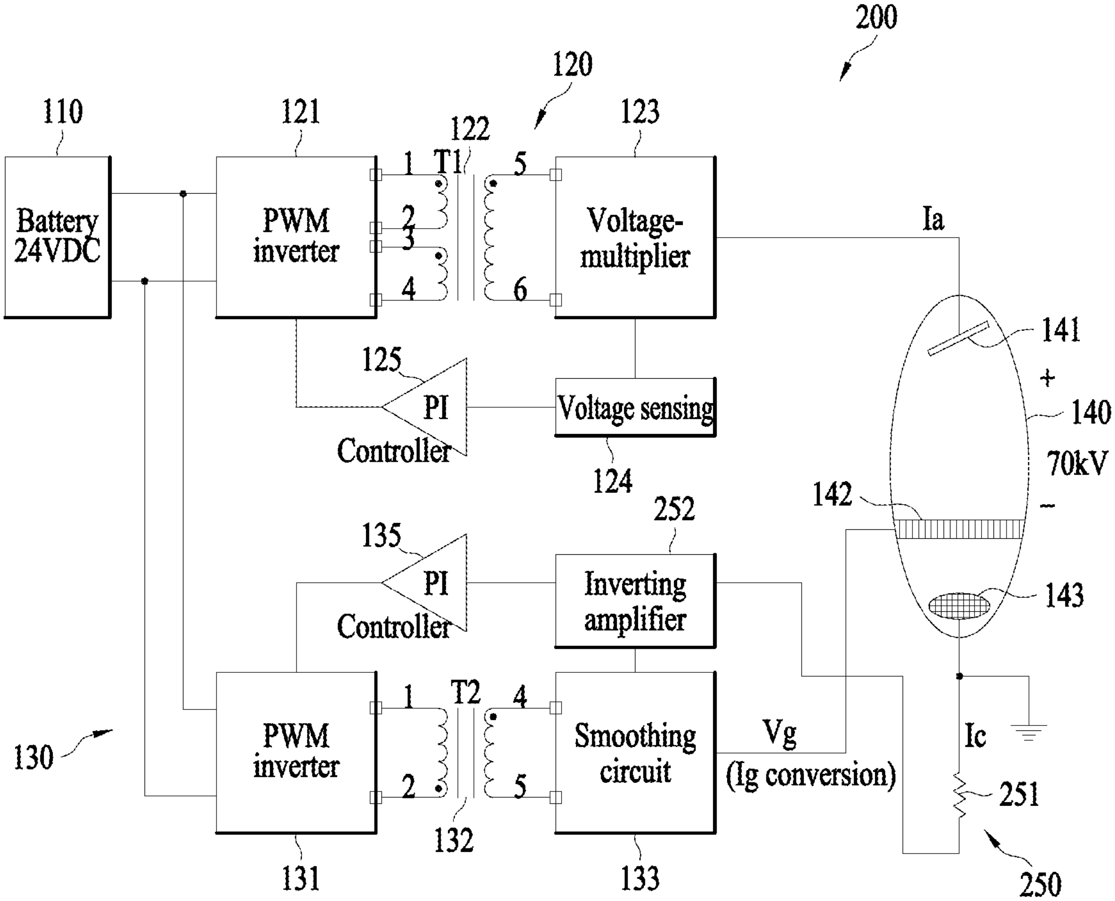
FIGS. 3A to 3C are block diagrams for explaining a configuration of an electromagnetic wave generation device and a current-sensing method according to a first example embodiment of the present disclosure.
Figure 3B:
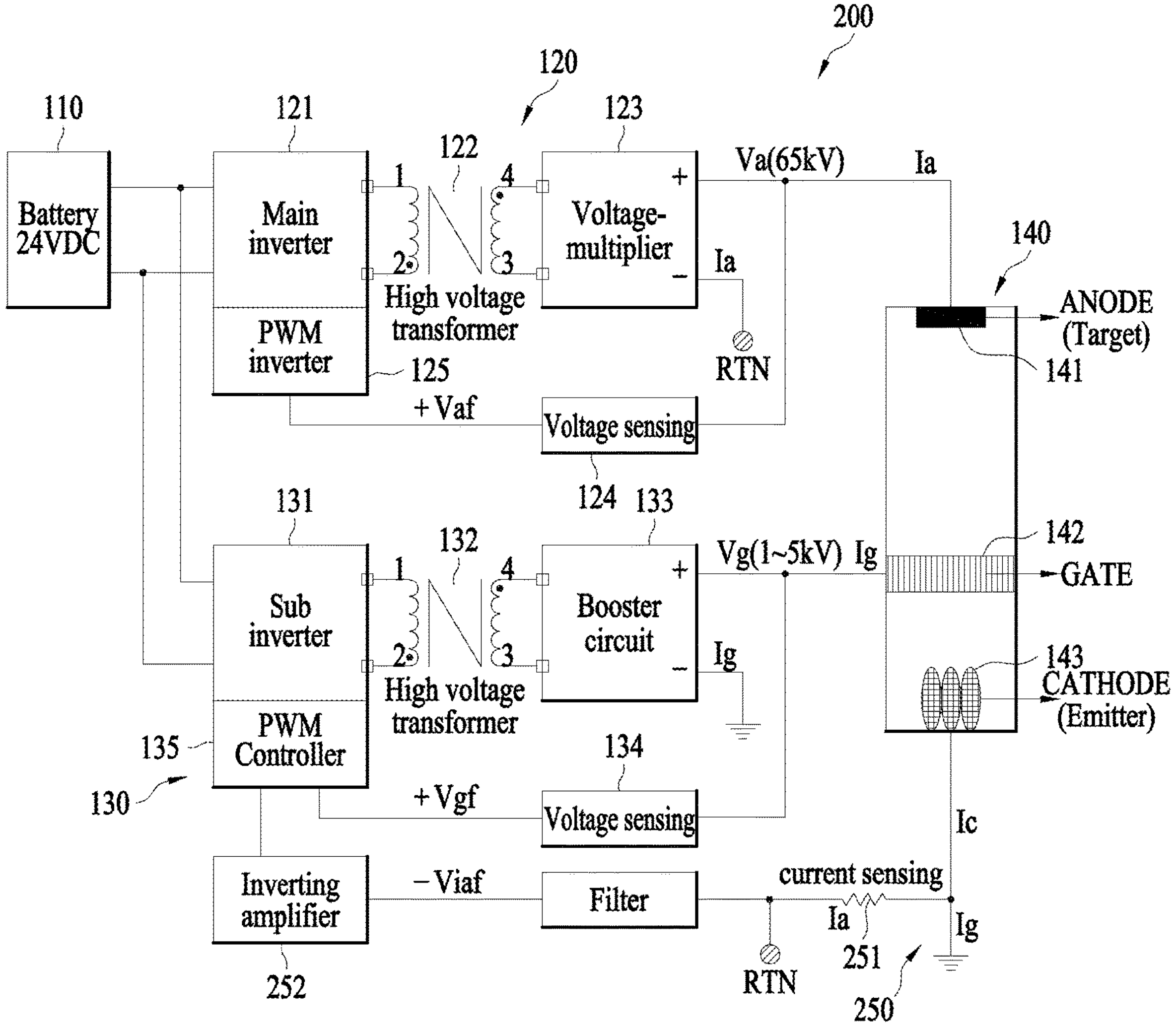
Figure 3C:
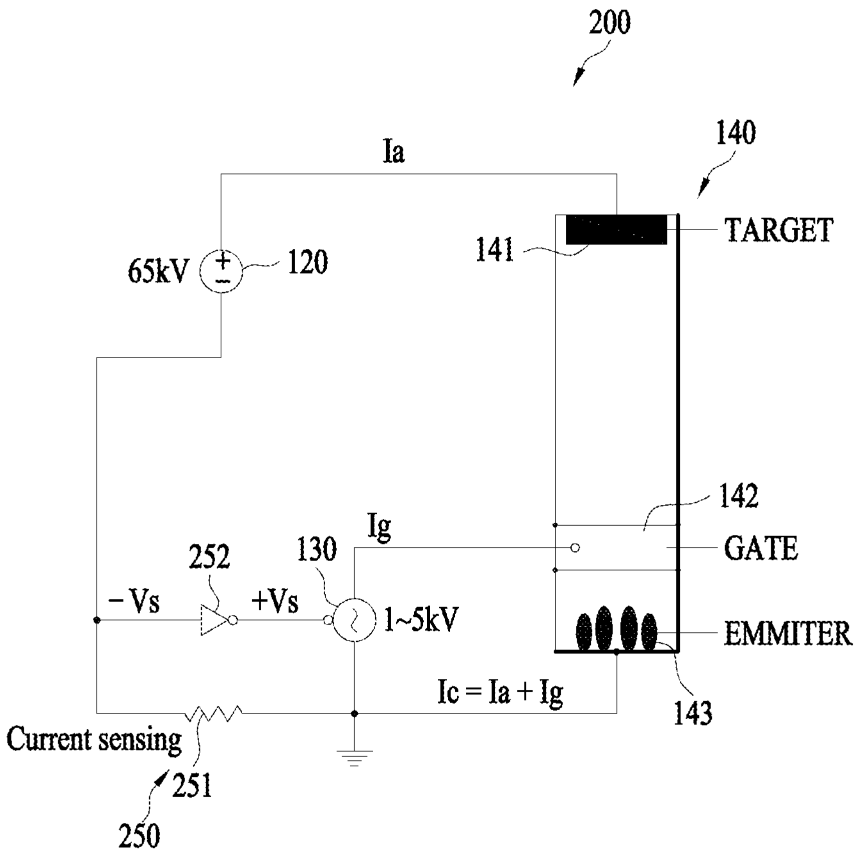

FIGS. 3A to 3C are block diagrams for explaining a configuration of an electromagnetic wave generation device 200 and a current-sensing method according to a first example embodiment of the present disclosure. Compared to the electromagnetic wave generation device 100 shown in FIGS. 1A and 1B, described above, the remaining components of the electromagnetic wave generation device 200 shown in FIGS. 3A to 3C are similar to each other with the exception of a current-sensing circuit 250. Accordingly, the description will focus on those differences.

As shown in FIG. 3A, the current-sensing circuit 250 is connected to a cathode 143 of a tube 140, and senses the anode-cathode current value flowing between an anode 141 and the cathode 143 of the tube 140 to provide to a gate power supply circuit 130.

Accordingly, the gate power supply circuit 130 controls the gate DC power supply based on the anode-cathode current value provided from the current-sensing circuit 250, which makes the current Ia supplied to the anode 141 of the tube 140 be adjusted directly.

Here, the cathode 143 of the tube 140 may be directly connected to the ground terminal. That is, the cathode 143 of the tube 140 may be directly connected to the ground terminal without passing through a current-sensing resistance 251 to be connected to the ground terminal.

On the other hand, the current-sensing circuit 250 may include a current-sensing resistance 251 connected to the node between the cathode 143 and the ground terminal. Moreover, the current-sensing circuit 250 may further include an inverting amplifier 252 connected to the current-sensing resistance 251. The inverting amplifier 252 may be connected to a PWM controller 135 of a PWM inverter 131.

That is, as shown in FIG. 3B, one side of the current-sensing resistance 251 may be connected to the cathode 143 and the ground terminal, and the other side of the current-sensing resistance 251 may be connected to an input terminal of the inverting amplifier 252. That is, one side of the current-sensing resistance 251 may be connected to the node between the cathode 143 and the ground terminal, and the other side may be connected to the inverted amplifier 252 via the filter. The inverting amplifier 252 may be connected to the PWM controller 135. Here, the voltage −Viaf may be inverted to the voltage +Viaf by the inverting amplifier 252. In addition, the operation of the gate power supply circuit 130 may be controlled based on the output of the inverting amplifier 252.

On the other hand, the other side of the current-sensing resistance 251 may be connected to the output terminal of an anode power supply circuit 120 to form a loop. Specifically, the other side of the current-sensing resistance 251 may be connected to the negative end of a booster circuit 123 (a voltage-multiplier or a smoothing circuit) of the anode power supply circuit 120 to form a closed loop. Accordingly, the current value measured through the current-sensing resistance 251 may correspond to the anode current.

As described above, as shown in FIG. 3C, the method of generating high voltage is the same as described above, but the current-sensing method is changed so that the current Ia supplied to the anode 141 of the tube 140 can be measured correctly. However, since the sensed voltage is negative, unlike the above, it may be inverted by the inverting amplifier 252 to input to the PWM controller 135

When the current-sensing method is changed as shown above, the current flowing in the current-sensing resistance 251 becomes Ia same as the current supplied to the anode 141. Therefore, since the Ia current may be actually adjusted regardless of the change of leakage current Ig, the electromagnetic wave changes according to the aging of the tube 140 are compensated to make stable operation. As such, the amount of electromagnetic waves generated can be adjusted by controlling the current flowing in the tube in the example embodiment, and accordingly, the desired result (e.g., image) can be obtained. For example, in a radiography device, the amount of X-ray required to obtain the image may be determined, and accordingly, the current flowing in the tube may be controlled to generate the required X-rays to perform the radiographic shooting.

Figure 4A:
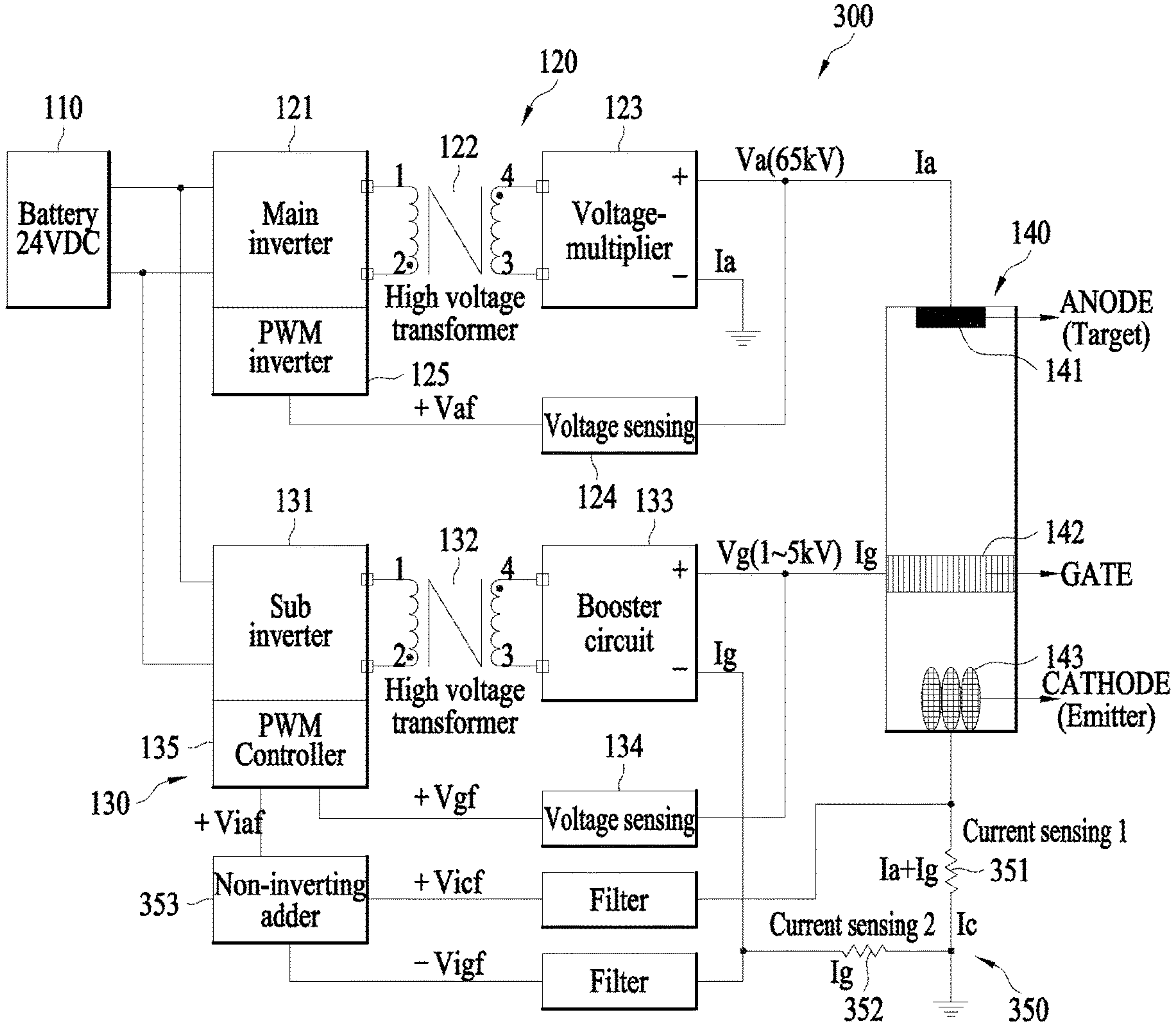
FIGS. 4A and 4B are block diagrams for explaining a configuration of an electromagnetic wave generation device and a current-sensing method according to a second example embodiment of the present disclosure.
Figure 4B:
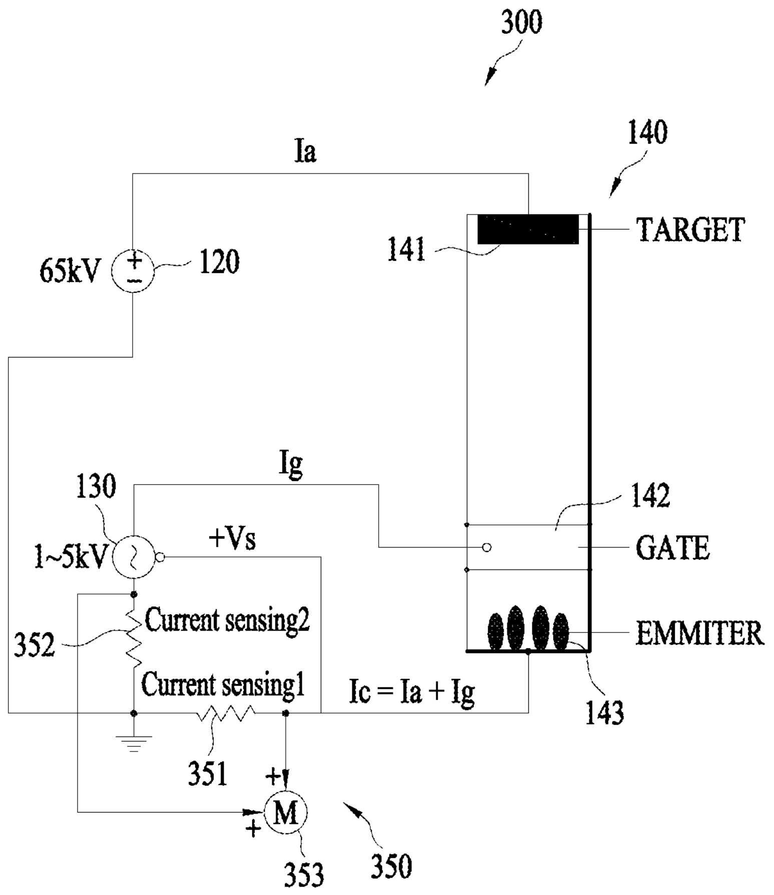

FIGS. 4A and 4B are block diagrams for explaining a configuration of an electromagnetic wave generation device 300 and a current-sensing method according to a second example embodiment of the present disclosure.

As shown in FIG. 4A, in the electromagnetic wave generation device 300, a current-sensing circuit 350 may include a first current-sensing resistance 351 and a second current-sensing resistance 352. Here, the first current-sensing resistance 351 may be connected between a cathode 143 of a tube 140 and a ground terminal, and the second current-sensing resistance 352 may be connected to the node between the first current-sensing resistance 351 and the ground terminal.

In addition, the current-sensing circuit 350 may further include a non-inverting adder 353 connected to the first current-sensing resistance 351 and the second current-sensing resistance 352. Here, the non-inverting adder 353 may be connected to a PWM controller 135 for the control of a PWM inverter 131 of a gate power supply circuit 130. In addition, the negative end of a booster circuit 133 of the gate power supply circuits 130 may be connected to the node between an input filter of the non-inverting adder 353 and the second current-sensing resistance 352.

In other words, one side of the first current-sensing resistance 351 may be connected to the cathode 143, and the other side may be connected to the ground terminal. In addition, one side of the first current-sensing resistance 351 may be connected to the input terminal of the non-inverting adder 353. That is, the node between the first sensing resistance 351 and the cathode 143 may be connected to the non-inverting adder 353 via a filter.

In addition, one side of the second current-sensing resistance 352 may be connected to the first current-sensing resistance 351 and the ground terminal, and the other side may be connected to the input terminal of the non-inverting adder 353. That is, one side of the second current-sensing resistance 352 may be connected to the node between the first current-sensing resistance 351 and the ground terminal, and the other side may be connected to the non-inverting adder 353 via the filter. In addition, the other side of the second current-sensing resistance 352 may also be connected to an output terminal of the gate power supply circuit 130. Specifically, the other side of the second current-sensing resistance 352 may be connected to the negative end of the booster circuit 133 described above.

As described above, as shown in FIG. 4B, the current value sensed in the first current-sensing resistance 351 and the current value sensed in the second current-sensing resistance 352 are processed in the non-inverting adder 353, and, as a result, the current Ia, which is purely supplied to the anode, may be sensed. Thus, the operation of the gate power supply circuit 130 may be controlled based on the output of the non-inverting adder 353. By controlling the voltage of the gate 142 based on the current Ia, the actual current Ia is controlled regardless of the change of Ig to obtain the optimal electromagnetic wave. Meanwhile, the configurations of the inverting amplifier and non-inverting amplifier throughout overall example embodiments are to amplify the information obtained from the current-sensing resistance, and at least one of the inverting amplifier and non-inverting amplifier may be selectively used according to the configuration of the controller.

Figure 5:
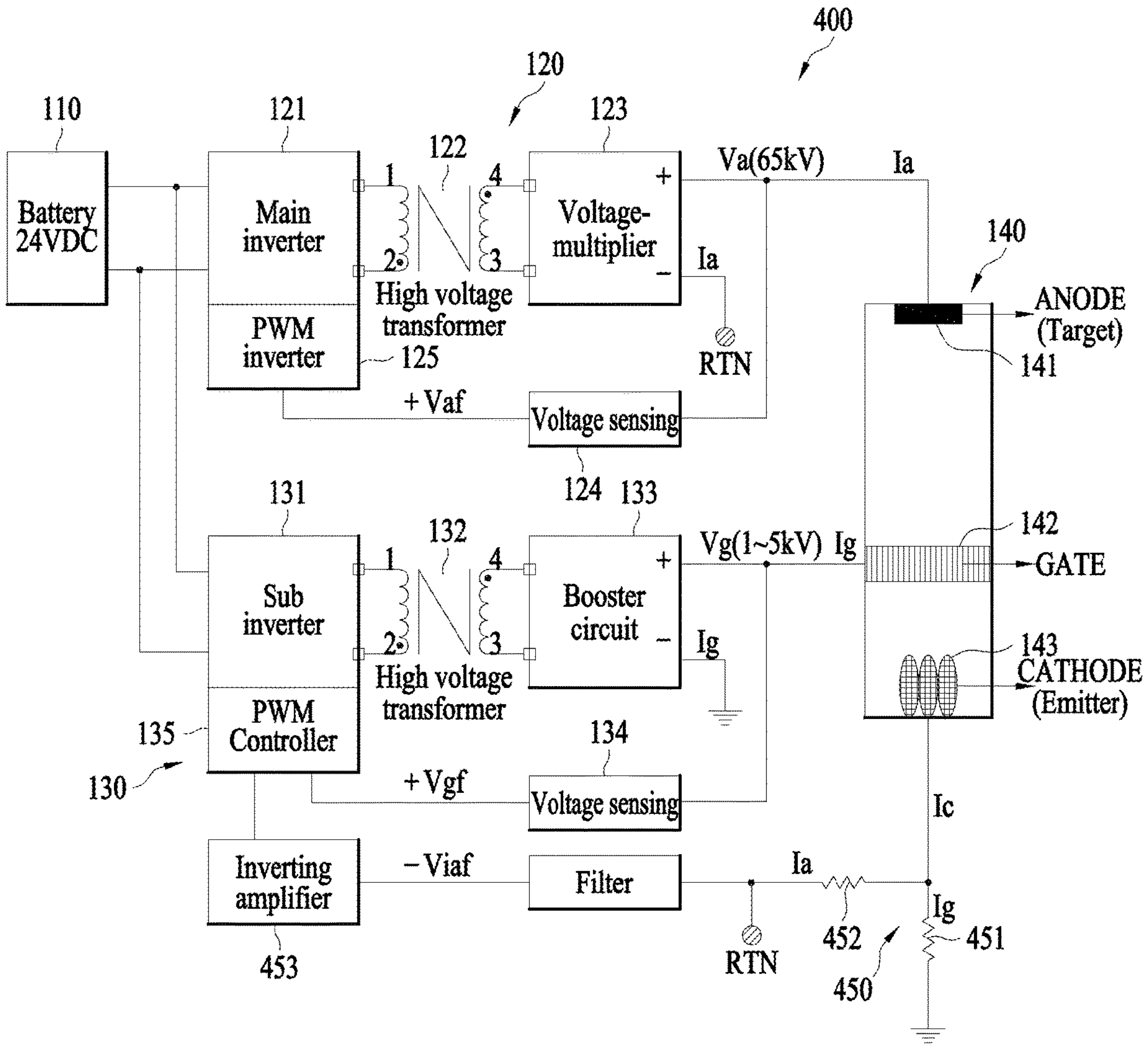
FIG. 5 is a block diagram illustrating a configuration of an electromagnetic wave generation device and a current-sensing method according to a third example embodiment of the present disclosure.

FIG. 5 is a block diagram illustrating a configuration of an electromagnetic wave generation device 400 and a current-sensing method according to a third example embodiment of the present disclosure. Compared to the electromagnetic wave generation device 200 shown in FIG. 3B, described above, the remaining components of the electromagnetic wave generation device 400 shown in FIG. 5 are similar to each other with the exception of a current-sensing circuit 450. Accordingly, the description will focus on those differences.

As shown in FIG. 5, the current-sensing circuit 450 is connected to a cathode 143 of a tube 140, and it may sense the anode-cathode current value flowing between an anode 141 and the cathode 143 of the tube 140 to provide the sensed information to a gate power supply circuit 130.

The current-sensing circuit 450 may include a first current-sensing resistance 451 between the cathode 143 and a ground terminal. One side of the first current-sensing resistance 451 may be connected to the cathode 143 and the other side may be connected to the ground terminal. The current-sensing circuit 450 may further include a second current-sensing resistance 452 connected to the node between the cathode 143 and the first current-sensing resistance 451. One side of the second current-sensing resistance 452 is connected to the cathode and the first current-sensing resistance 451, specifically to the node between the cathode 143 and the first current-sensing resistance 451, and the other side of the second current-sensing resistance 452 may be connected to an input terminal of an inverting amplifier 453. The inverting amplifier 453 may be connected to a PWM controller 135. Here, the voltage −Viaf may be inverted to the voltage +Viaf by the inverting amplifier 453, and the operation of the gate power supply circuit 130 may be controlled based on the output of the inverting amplifier 453.

According to an example embodiment, the other side of the second current-sensing resistance 452 may be connected to an output terminal of an anode power supply circuit 120 to form a loop. Specifically, the other side of the current-sensing resistance 452 may be connected to the negative end of a booster circuit 123 (a voltage-multiplier or a smoothing circuit) of the anode power supply circuit 120 to form a closed loop. Accordingly, the current value measured through the second current-sensing resistance 452 may correspond to the anode current.

Based on the fact that the current value measured through the second current-sensing resistance 452 corresponds to the anode current, the first current-sensing resistance 451 may measure the current supplied to the gate. Therefore, the electromagnetic wave generation device 400 may directly measure the gate current Ig through the first current-sensing resistance 451 without predicting the gate current Ig from the voltage Vg supplied to the gate from the gate power supply circuit 130.

Meanwhile, the operation of the gate power supply circuit 130 may be controlled based on the gate current Ig_esti predicted from the voltage Vg supplied to the gate from the gate power supply circuit 130 and the gate current Ig_real measured through the first current-sensing resistance 451. In one example, a comparison of the predicted value Ig_esti to the measured value Ig_real may be used to verify whether the electromagnetic wave generation device is working properly and there is no leakage current. If Ig_esti and Ig_real do not match, it may be determined that the device is not working properly, and the user may be notified through an alarm. This can be verified through a recording medium written in a programming language that computers such as software can read. In addition, when the anode current measured through the second current-sensing resistance 452 does not match the set value, the operation of the gate power supply circuit 130 may be controlled. Specifically, when the measured anode current does not match the set value, Vg may be adjusted through the PWM controller 135. In this way, the anode current value may be adjusted through the control of Vg supplied to the gate According to an example embodiment, a verification circuit may be further configured to verify the electromagnetic wave generation device. The electromagnetic wave generation device 400 of FIG. 5 may measure the gate current with the first current-sensing resistance 451 and the anode current with the second current-sensing resistance 452. Here, a first verification resistance (not shown) may be added between the cathode 143 and the first current-sensing resistance 451. One side of the first verification resistance will be connected to the cathode 143, and the other side will be connected to the first current-sensing resistance 451 or the node between the first current-sensing resistance 451 and the second current-sensing resistance 452. The electromagnetic wave generation device 400 may measure the anode-cathode current output from the tube 140 through the first verification resistance. This allows checking the relationship between the current values corresponding to the anode, gate, and cathode, respectively. If the combined value of the gate current and the cathode current does not correspond to the anode current value, it means that the device does not work properly, so an alarm may notify the user of the abnormal behavior.

Meanwhile, such a verification circuit is also applicable to the example embodiment of FIGS. 3A to 3C. For example, a first verification resistance (not shown) may be added between the cathode 143 and the ground terminal, and a second verification resistance (not shown) may be added to the ground terminal of the gate power supply circuit 130. In this case, by measuring the anode current at the current-sensing resistance 251, the anode-cathode current output from the tube 140 at the first verification resistance, and the gate current at the second verification resistance, it can be determined whether the combined value of the gate current and the anode current corresponds to the value of the anode-cathode current. Similarly, if the combined value of the gate current and cathode current does not correspond to the anode current value, it means that the device is not operating properly, and an alarm may be used to notify the user of the abnormal behavior.

Figure 6:
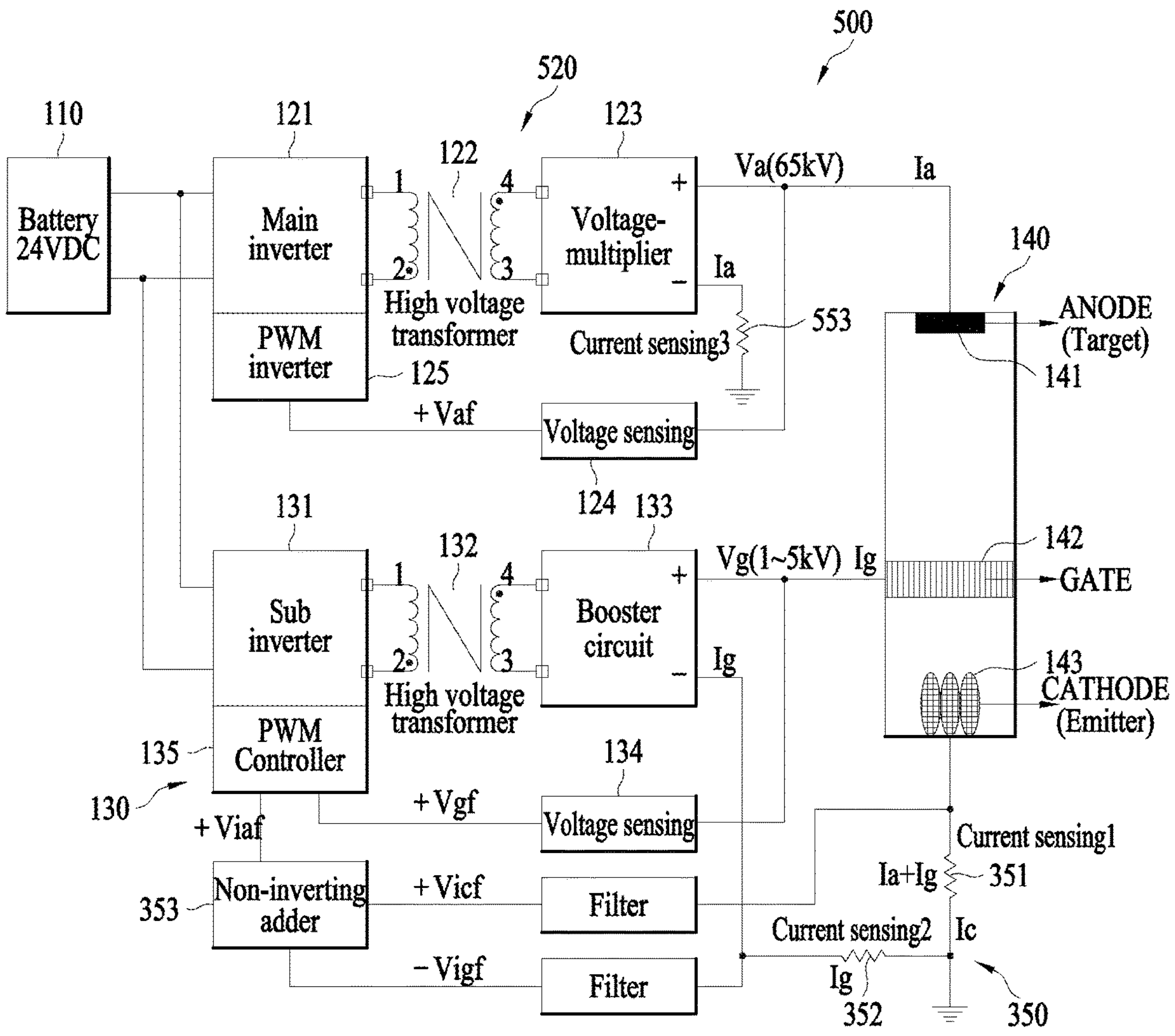
FIG. 6 is a block diagram illustrating a configuration of an electromagnetic wave generation device and a current-sensing method according to a fourth example embodiment of the present disclosure.

FIG. 6 is a block diagram illustrating a configuration of an electromagnetic wave generation device 500 and a current-sensing method according to a fourth example embodiment of the present disclosure. Compared to the electromagnetic wave generation device 300 shown in FIG. 4A, described above, the remaining components of the electromagnetic wave generation device 500 are similar to each other with the exception of an anode power supply circuit 520. Accordingly, the description will focus on those differences.

As shown in FIG. 6, the anode power supply circuit 520 may include a third current-sensing resistance 553 at a ground terminal. Specifically, one side of the third current-sensing resistance 553 may be connected to an output terminal of the anode power supply circuit 520, and the other side may be connected to the ground terminal. Accordingly, the third current-sensing resistance 553 may measure the current supplied to the anode. At this time, the ground terminal may be a single ground terminal to which one side of the first current-sensing resistance 351 and one side of the second current-sensing resistance 352 are connected.

As one side of the first current-sensing resistance 351 is connected to the cathode 143, the first current-sensing resistance 351 may measure the anode-cathode current output from the tube 140. In addition, as one side of the second current-sensing resistance 352 is connected to the node between the first current-sensing resistance 351 and the ground terminal and the other side is connected to an output terminal of the gate power supply circuit 130, the second current-sensing resistance 352 may measure the current supplied to the gate.

Meanwhile, the operation of the gate power supply circuit 130 may be controlled based on the anode current Ia_esti predicted from the first current-sensing resistance 351 and the second current-sensing resistance 352 and the anode current Ia_real measured through the third current-sensing resistance 553. In one example, a comparison of the predicted value Ia_esti to the measured value Ia_real may be used to verify whether the electromagnetic wave generation device is working properly and there is no leakage current. If Ia_esti and Ia_real do not match, it may be determined that the device is not working properly, and the user may be notified through an alarm. This can be verified through a recording medium written in a programming language that computers such as software can read. In addition, when the anode current measured through the third current-sensing resistance 553 does not match the set value, the operation of the gate power supply circuit 130 may be controlled. Specifically, when the measured anode current does not match the set value, Vg may be adjusted through the PWM controller 135. In this way, the anode current value may be adjusted through the control of Vg supplied to the gate The electromagnetic wave generation device according to an example embodiment of the present disclosure can minimize the leakage current with the voltage value as necessary by accurately sensing at least one of the current supplied to the anode and the current supplied to the gate. In addition, the electromagnetic wave generation device according to an example embodiment of the present disclosure can verify the normal operation of the device through sensing of the anode current and the gate current, thereby driving the electromagnetic wave generation device with a more accurate anode current.

On the other hand, in example embodiments of the present disclosure, the resistance for sensing the current can be referred to as a shunt resistance, and the current value that flows through the shunt resistance can be estimated based on the voltage difference of both ends of the shunt resistance. In example embodiments, the voltage across both ends of the shunt resistance may be sensed by the controller, and the power supplied to the gate and anode may be controlled by controlling the power supply circuit based on the sensed information. In example embodiments, the main inverter and the sub inverter are described as being controlled by respective PWM controllers, but are not limited thereto, and respective power supply circuits may be controlled by a single controller.

Figure 7:
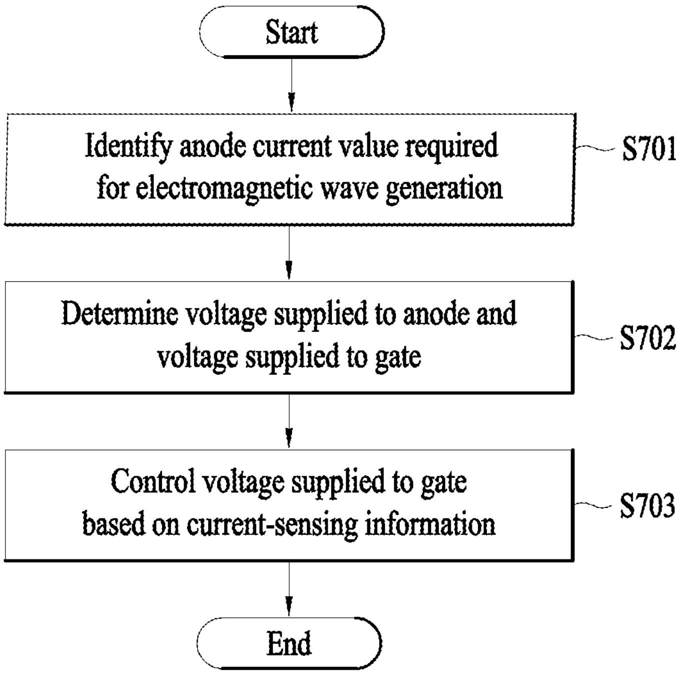
FIG. 7 is a flowchart illustrating a control method of an electromagnetic wave generation device according to an example embodiment of the present disclosure.

FIG. 7 is a flowchart illustrating a control method of an electromagnetic wave generation device according to an example embodiment of the present disclosure.

First, in operation S701, an anode current value required for electromagnetic wave generation may be identified. At this time, the anode current value may be a set value entered by a user in advance for generating electromagnetic waves. It may also be a value for the current supplied to the anode 141 from the anode power supply circuits 120 and 520 based on the set value.

In operation S702, the voltage supplied to the anode and the voltage supplied to the gate may be determined. This can be determined based on the anode current value identified in operation S701. The voltage supplied to the anode is a voltage supplied from the anode power supply circuits 120 and 520 to the anode 141, and the voltage supplied to the gate is a voltage supplied from the gate power supply circuit 130 to the gate 142.

In operation S703, the voltage supplied to the gate may be controlled based on current-sensing information. Here, the current-sensing information may refer to at least one of an anode current, a gate current, and a current flowing through the cathode which are sensed by the current-sensing circuits 150, 250, 350, and 450. According to an example embodiment, the current-sensing circuits 150, 250, 350, and 450 may include at least one resistance for sensing at least one of the anode current and gate current. In addition, the current-sensing information may include the anode current sensed in the anode power supply circuit 120 and 520.

For specific example embodiments of the electromagnetic wave generation device in connection with the above control method, reference is made to the example embodiments described herein.

The electromagnetic wave generation device according to an example embodiment of the present disclosure may be used in a stationary device, such as a computed tomography (CT) device, and may also be used in a portable device, such as an oral X-ray device. The cathodes referred to in this disclosure may comprise, but are not limited to, carbon nanotubes (CNTs).

The above is only example embodiments for implementing the electromagnetic wave generation device according to the present disclosure, and the present disclosure is not limited to the above example embodiments, and the technical spirit of the present disclosure will be said to be present to the extent that various modifications can be made without departing from the gist of the present disclosure by those skilled in the art to which the present disclosure pertains.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An X-ray radiation generation device comprising:
- a tube including an anode, a cathode, and at least one gate;
- a first power supply circuit in which one side of an output terminal is connected to the anode;
- a second power supply circuit in which one side of an output terminal is connected to the gate; and
- a current-sensing circuit connected to the tube and sensing a current flowing through the cathode,
- wherein the current-sensing circuit includes at least one resistance associated with the sensing of at least one of an anode current and a gate current,
- wherein the at least one resistance includes a first resistance having one side connected to the cathode and the other side connected to an input terminal of a first amplifier, and
- wherein the other side of the first resistance is connected to the other side of the output terminal of the first power supply circuit.

2. The X-ray radiation generation device of claim 1, wherein:
- the at least one resistance includes a-first second resistance having one side connected to the cathode and the other side connected to a ground terminal, and
- the other side of the output terminal of the second power supply circuit is connected to the ground terminal.

3. The X-ray radiation generation device of claim 1, wherein an operation of the second power supply circuit is controlled based on an output of the first amplifier.

4. The X-ray radiation generation device of claim 1, wherein:
- the at least one resistance includes second resistance having one side connected to the cathode and the first resistance, and the other side connected to a ground terminal, and
- an operation of the second power supply circuit is controlled based on current information related to the second resistance and an output voltage of the second power supply circuit.

5. The X-ray radiation generation device of claim 1, wherein the gate is any one of gates of grid, wire, or pin-hole structure.

6. The X-ray radiation generation device of claim 1, wherein the cathode is comprised of carbon nanotubes (CNTs).

7. An X-ray radiation generation device comprising:
- a tube including an anode, a cathode, and at least one gate;
- a first power supply circuit in which one side of an output terminal is connected to the anode;
- a second power supply circuit in which one side of an output terminal is connected to the gate; and
- a current-sensing circuit connected to the tube and sensing a current flowing through the cathode,
- wherein the current-sensing circuit includes at least one resistance associated with the sensing of at least one of an anode current and a gate current,
- wherein the at least one resistance includes:
- a first resistance having one side connected to the cathode and the other side connected to a ground terminal; and
- a second resistance having one side connected to the first resistance and the ground terminal, and the other side is connected to one side of an input terminal of a first adder.

8. The X-ray radiation generation device of claim 7, wherein the one side of the first resistance is connected to the other side of the input terminal of the first adder.

9. The X-ray radiation generation device of claim 7, wherein the other side of the second resistance is connected to the other side of an output terminal of the second power supply circuit.

10. The X-ray radiation generation device of claim 7, wherein an operation of the second power supply circuit is controlled based on an output of the first adder.

11. The X-ray radiation generation device of claim 7, wherein:
- the first power supply circuit includes a third resistance having one side connected to the other side of an output terminal of the first power supply circuit and the other side connected to the ground terminal, and
- an operation of the second power supply circuit is controlled based on current information related to the third resistance and current information related to the first resistance.

12. The X-ray radiation generation device of claim 7, wherein the first power supply circuit includes a third resistance having one side connected to the other side of the output terminal of the first power supply circuit, and the other side connected to a ground terminal.

13. The X-ray radiation generation device of claim 7, wherein the gate is any one of gates of grid, wire, or pin-hole structure.

14. The X-ray radiation generation device of claim 7, wherein the cathode is comprised of carbon nanotubes (CNTs).

15. A control method of an X-ray radiation generation device, wherein the X-ray radiation generation device comprises:
- a tube including an anode, a cathode, and at least one gate;
- a first power supply circuit in which one side of an output terminal is connected to the anode;
- a second power supply circuit in which one side of an output terminal is connected to the gate; and
- a current-sensing circuit connected to the tube and sensing a current flowing through the cathode,
- wherein the current-sensing circuit includes at least one resistance associated with the sensing of at least one of an anode current and a gate current,
- wherein the at least one resistance includes a first resistance having one side connected to the cathode and the other side connected to an input terminal of a first amplifier, and the other side of the first resistance is connected to the other side of the output terminal of the first power supply circuit, wherein the method comprises:

identifying an anode current value required for X-ray radiation generation;

determining a voltage supplied to the anode and a voltage supplied to the gate based on the identified anode current value; and controlling the voltage supplied to the gate based on current-sensing information about at least one of the anode current, a gate current, and a current flowing through the cathode.

16. A control method of an X-ray radiation generation device, wherein the X-ray radiation generation device comprises:

a tube including an anode, a cathode, and at least one gate;

a first power supply circuit in which one side of an output terminal is connected to the anode;

a second power supply circuit in which one side of an output terminal is connected to the gate; and a current-sensing circuit connected to the tube and sensing a current flowing through the cathode, wherein the current-sensing circuit includes at least one resistance associated with the sensing of at least one of an anode current and a gate current, wherein the at least one resistance includes:

a first resistance having one side connected to the cathode and the other side connected to a ground terminal; and a second resistance having one side connected to the first resistance and the ground terminal, and the other side is connected to one side of an input terminal of a first adder, wherein the method comprises:

identifying an anode current value required for X-ray radiation generation;

determining a voltage supplied to the anode and a voltage supplied to the gate based on the identified anode current value; and controlling the voltage supplied to the gate based on current-sensing information about at least one of the anode current, a gate current, and a current flowing through the cathode.

* * * * *